US010489170B2

(12) United States Patent
Toal et al.

(10) Patent No.: US 10,489,170 B2
(45) Date of Patent: Nov. 26, 2019

(54) APPLICATION WARMUP ENGINE

(71) Applicant: salesforce.com, inc., San Francisco, CA (US)

(72) Inventors: Brian Toal, San Francisco, CA (US); Paymon Teyer, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 207 days.

(21) Appl. No.: 15/626,897

(22) Filed: Jun. 19, 2017

(65) Prior Publication Data

US 2018/0365036 A1 Dec. 20, 2018

(51) Int. Cl.
*G06F 9/44* (2018.01)
*G06F 9/455* (2018.01)
*G06F 9/30* (2018.01)
*G06F 9/445* (2018.01)

(52) U.S. Cl.
CPC ...... *G06F 9/44578* (2013.01); *G06F 9/30047* (2013.01); *G06F 9/44505* (2013.01); *G06F 9/45504* (2013.01)

(58) Field of Classification Search
CPC combination set(s) only.
See application file for complete search history.

(56) References Cited

U.S. PATENT DOCUMENTS

| 5,577,188 | A  | 11/1996 | Zhu |
| 5,608,872 | A  | 3/1997  | Schwartz et al. |
| 5,649,104 | A  | 7/1997  | Carleton et al. |
| 5,715,450 | A  | 2/1998  | Ambrose et al. |
| 5,761,419 | A  | 6/1998  | Schwartz et al. |
| 5,819,038 | A  | 10/1998 | Carleton et al. |
| 5,821,937 | A  | 10/1998 | Tonelli et al. |
| 5,831,610 | A  | 11/1998 | Tonelli et al. |
| 5,873,096 | A  | 2/1999  | Lim et al. |
| 5,918,159 | A  | 6/1999  | Fomukong et al. |
| 5,963,953 | A  | 10/1999 | Cram et al. |
| 5,983,227 | A  | 11/1999 | Nazem et al. |
| 6,092,083 | A  | 7/2000  | Brodersen et al. |
| 6,161,149 | A  | 12/2000 | Achacoso et al. |
| 6,169,534 | B1 | 1/2001  | Raffel et al. |
| 6,178,425 | B1 | 1/2001  | Brodersen et al. |
| 6,189,011 | B1 | 2/2001  | Lim et al. |
| 6,216,133 | B1 | 4/2001  | Masthoff |

(Continued)

*Primary Examiner* — Stefan Stoynov

(74) *Attorney, Agent, or Firm* — Schwabe Williamson & Wyatt

(57) ABSTRACT

Systems, methods, and computer-readable media for increasing program execution time are described. A computer system may implement a warmup engine that may allow defined portions of code to be pre-loaded ("warmed up") for execution before application startup. The warmup engine may include warmup logic that warms up a defined portion of code. The mechanisms that trigger the warmup logic are called "warmers," and each warmer may run in a warmer container. The computer system may execute each of the warmers according to a warmer configuration and may also log errors that may occur during warmer execution. In some implementations, an application may not become available during initialization until (or after) the warmup engine executes the warmers and/or warmup logic. Other embodiments may be described and/or claimed.

20 Claims, 6 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,071,702 B2 * | 6/2015 | Choi ................. H04M 1/72566 |
| 9,507,613 B2 * | 11/2016 | Zhou ....................... G06F 9/445 |
| 9,973,566 B2 * | 5/2018 | Hebert .................... H04L 67/10 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |

(56) References Cited

U.S. PATENT DOCUMENTS

| | | |
|---|---|---|
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2018/0246729 A1* | 8/2018 | Kumar .................. G06F 9/445 |

* cited by examiner

APPLICATION WARMUP ENGINE

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to computing systems, and some embodiments relate to increasing application execution in computing systems.

BACKGROUND

In many computing environments, application containers, and/or virtual machines (VMs), program code running in the environment is typically not native code and usually requires an interpreter to execute native code. Native code/applications are code/applications that are specific to a hardware and/or operating system platform implemented by a computing system. For example, Java Virtual Machine (JVM) acts as an interpreter to convert Bytecodes to native code of the hosting operating system. Such computing environments typically use a Just-in-Time (JIT) compiler, which is a compiler that operates during execution of a program (i.e., runtime) rather than prior to execution. For example, JVM JIT compiler compiles bytecode into native machine code at runtime for direct execution on the hardware. However, conventional JIT compilation requires additional computing resources (e.g., processor time and memory usage), which significantly hinders system performance.

JVM implementations include a solution to the aforementioned complication in that the JVM JIT compiler monitors the sequences of bytecode that are frequently executed and translates the frequently executed bytecode into native machine code. The JIT compilation used by such systems may be used to run frequently used code at relatively high speed after an initial phase of slow interpretation. One complication with this approach is that JVM JIT compilation still requires a relatively large number of executions of the interpreted code after application startup/initialization before compiling bytecodes into native code, which significantly affects the startup time. Additionally, the initial phase of slow interpretation occurs each time the application or system is restarted because the frequently executed bytecode is no longer available when the application or system is restarted.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
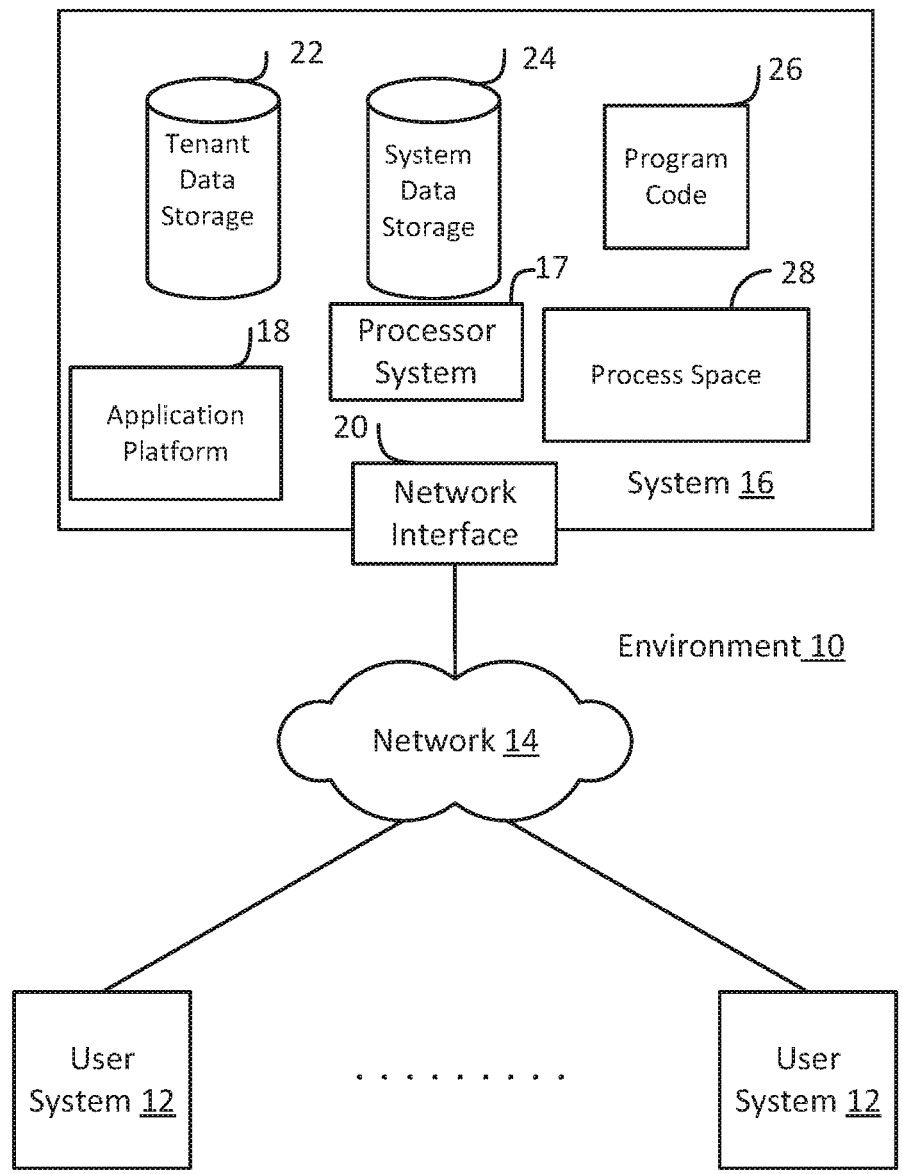
FIG. 1A shows a block diagram of an example environment in which an on-demand database service can be used according to some implementations.

Embodiments discussed herein are directed to computing systems, for example, multi-tenant database systems, and in particular to managing and accounting for memory utilization/allocation in computing systems. In many computing systems that implement virtual machines (VMs) or application containers, such as those that implement Java Virtual Machines (JVM) that runs java code, may include a Just-in-Time (JIT) compiler that looks over program code that is being executed often when compared to other code, and when that program code reaches a predetermined threshold or count, the JT compiler compiles that program code during runtime into native code so that it may run faster on the underlying hardware. One complication is that, when these systems are first running, the program code operates relatively slow and then speeds up as the JT compiler incrementally adds components that reach the predetermined threshold/count. However, when these systems are restarted or shut down, the VM/container returns to its initial state, which means that the program code that was previously converted is again slow to start. For certain applications, this latency can cause significant performance issues as the host loads ramp up due to increases in service times at the same arrival rate. The additional load may also cause a series of cascading performance issues that may impact user request latencies after system startup.

According to various embodiments, a computer system (or a VM or container operated by a computer system) may implement a warmup engine. The warmup engine may allow defined portions of application code and/or data to be pre-requested, pre-loaded, pre-fetched, etc. for execution before application and/or service startup. For example, the warmup engine may pre-load caches with desired data items, pre-fetch machine code from memory, transition desired bytecode(s) from interpreted to compiled, pre-fetch and pre-load desired classes, pre-request desired application code and/or data items from a remote computing system, pre-request and/or pre-load webpages (e.g., linking, Domain Name System (DNS) prefetching, etc.) or other external resources (e.g., documents, image content, audio content, video content, etc.), or and/or the like. Additionally, the warmup engine may be used to pre-execute or perform various functions, actions, or tasks. The pre-requesting, pre-loading, pre-fetching, pre-execution etc. of desired portions of application code, data items, tasks/actions, etc. may be referred to as "warming up", "application warm up", and/or the like.

In embodiments, the warmup engine may include warmup logic that warms up the defined portion of code. The mechanisms that trigger the warmup logic may be referred to as "warmers," and each warmer may run in a corresponding warmer container. Each warmer may operate in accordance with a warmer configuration, which defines various parameters, conditions, settings. etc. for executing the warmer and/or warmup logic. The warmup engine may also log errors that may occur during warmer and/or warmup logic execution.

In embodiments, the warmup engine may allow developers to register warmer/warmup logic implementations that execute warmup logic specific to a corresponding domain, which may be required to warm up services of that domain. Additionally, the warmup engine may allow developers to develop custom warmup logic that defines a specific service to be run at predefined times to, for example, provide optimal user experience, prioritize the specific service over other services, and the like. In this way, the warmup engine may provide reliable and predictable request latencies after system startup and/or prior to application availability announcement.

According to various embodiments, an application may not become available during initialization until (or after) the warmup engine executes the warmers and/or warmup logic, or until a maximum warm up period elapses. In some embodiments, warm up may be decoupled from service startup for applications that do not need warm up at startup/ initialization. However, services that are required at system startup may be warmed up during the system start up. In cases where warmup logic has been coupled with service startup logic, the warmup engine may host the warm up execution.

In embodiments, the warmup configurations may be user/ developer defined. The warmup configurations may define various parameters for warmup logic execution, such as a time when a warmer is to be executed (e.g., during startup or not, a specific time and/or date, etc.); a maximum number of timeouts (e.g., a number of seconds before killing one or more warmers); a timeout time period (e.g., amount of time before a warmer is considered timed out); a maximum number of iterations of a warmer; environment type(s) for the warmer; and/or the like. Additionally, the warmup configuration may define different warmers to be loaded based on environment type (e.g., application servers v. development/sandbox machines). This is because different types of warmers (or no warmers) may be needed for different types of environments.

In embodiments, the warmup engine may provide error handling. Two types of errors may occur during warmup execution; implementation errors (e.g., due to lack of (or unavailable) resources) and execution errors (e.g., errors due to execution failure, timeouts, etc.). For implementation errors, every error may be logged to identify the unavailable resources. For execution errors, every error may be logged to identify where/why the warmer failed, and the warmup configuration may define a number of errors that may be allowed before terminating execution of the warmer.

In embodiments, the warmup logic may provide a single abstraction that developers can inject their corresponding warmup logic, without having to consider developing warmer integration/orchestration interfaces with service startup, figure out how to gate the application from announcing itself when warmup is running, resource allocation, logging, prioritization, or any other cross-cutting concern that would be required when adding warmup logic.

Warmup engine of the embodiments discussed herein may be used for a plurality of use cases, such as: loading caches at predefined times; requesting, obtaining, and loading database objects/elements from a remote database, tenant space, etc.; transitioning Java bytecode from interpreted to compiled; loading classes including any custom warmup logic that a specific service would like to run to provide optimal user experience; sending HTTP requests for a list of uniform resource locators (URLs) so that various server-side application subsystems are warmed up; Apex programming language precompiling; priming on-heap memory, Berkeley DB (BDB), and file system cache by enumerating a list of hot keys/values that were dumped on a previous shutdown; providing seamless software releases by migrating traffic from hosts running a first version of an application or platform to hosts running a second version of the application or platform; and/or the like.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks" have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to enterprise social networking and/or multi-tenant database systems, those of ordinary skill in the art should understand that the disclosed techniques are neither limited to such systems and can be implemented in the context of various other computing systems such as cloud-based systems that are not part of a multi-tenant database system or which do not provide enterprise social networking services.

As used herein, the term "tenant" may include a group of users who share common access with specific privileges to a software instance. A multi-tenant architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

FIG. 1A shows a block diagram of an example of an environment 10 in which an on-demand database service can be used in accordance with some implementations. The environment 10 includes user systems 12, a network 14, a database system 16 (also referred to herein as a "cloud-based system", "computing system", or "system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant system (MTS). The terms "multi-tenant system", "multi-tenant database system", and the like can refer to those systems in which various elements of hardware and software of a computing system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system and/or computing system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium®) processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
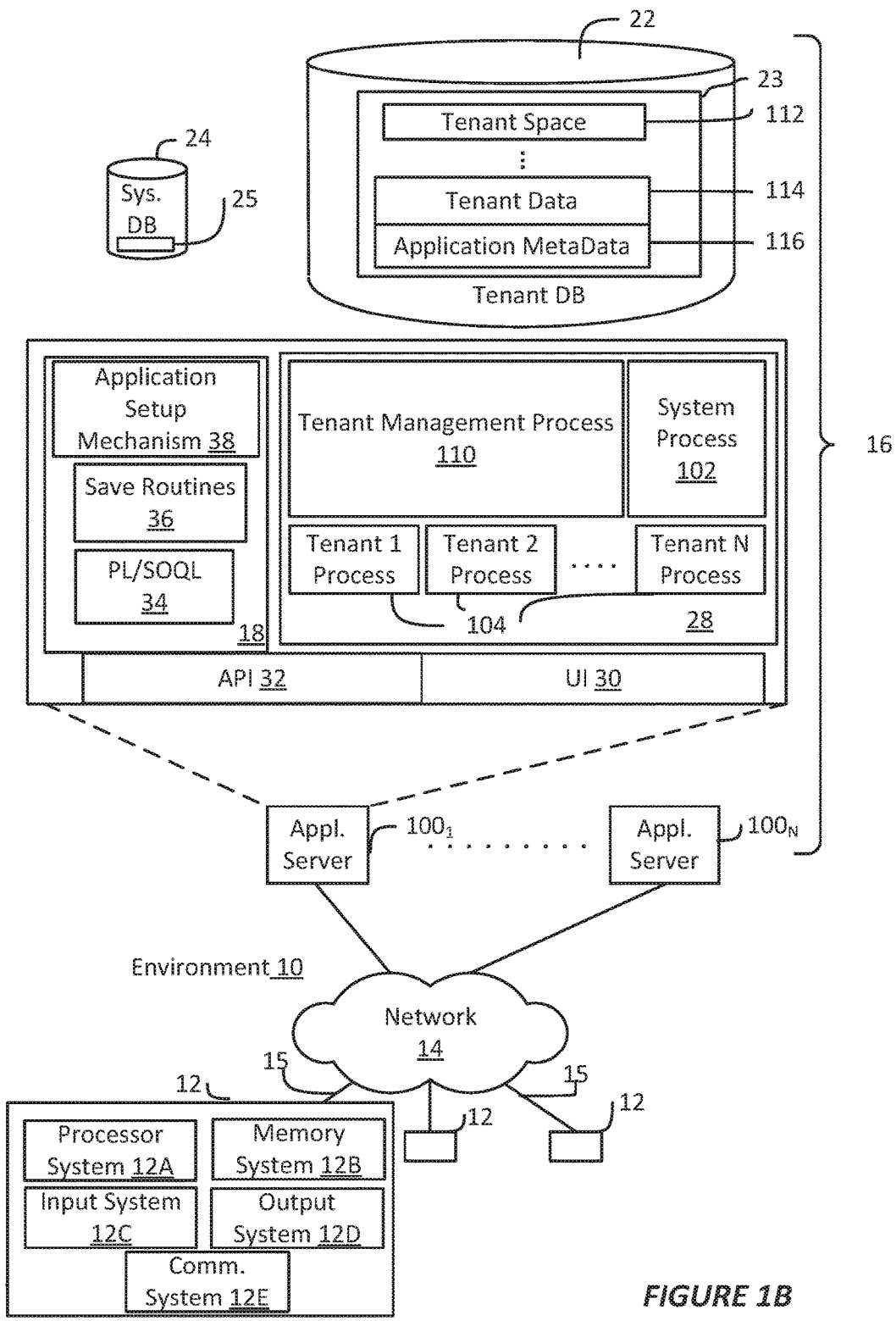
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E. The processor system 12A can include any suitable combination of one or more processors, such as one or more central processing units (CPUs) including single-core or multi-core processors, one or more graphics processing units (GPUs), one or more field-programmable gate arrays (FPGAs), or any other electronic circuitry capable of executing program code and/or software modules to perform arithmetic, logical, and/or input/output operations. The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks. The communications system 12E may include circuitry for communicating with a wireless network or wired network. Communications system 12E may be used to establish a link 15 (also referred to as "channel 15," "networking layer tunnel 15," and the like) through which the user system 12 may communicate with the system 16. Communications system 12E may include one or more processors (e.g., baseband processors, etc.) that are dedicated to a particular wireless communication protocol (e.g., Wi-Fi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches, filters, amplifiers, antenna elements, and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the system 16, the user system 12 using the communications system 12E may establish link 15 with network interface 20 of the system 16.

In FIG. 1B, the network interface 20 may be implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The application servers $100_1$-$100_N$ may include their own processor systems, memory systems, input and output systems, network interface/communications systems, etc. that are the same or similar to the other processor systems, memory systems, input and output systems, network interface/communications systems discussed herein. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system, such as system 16.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2:
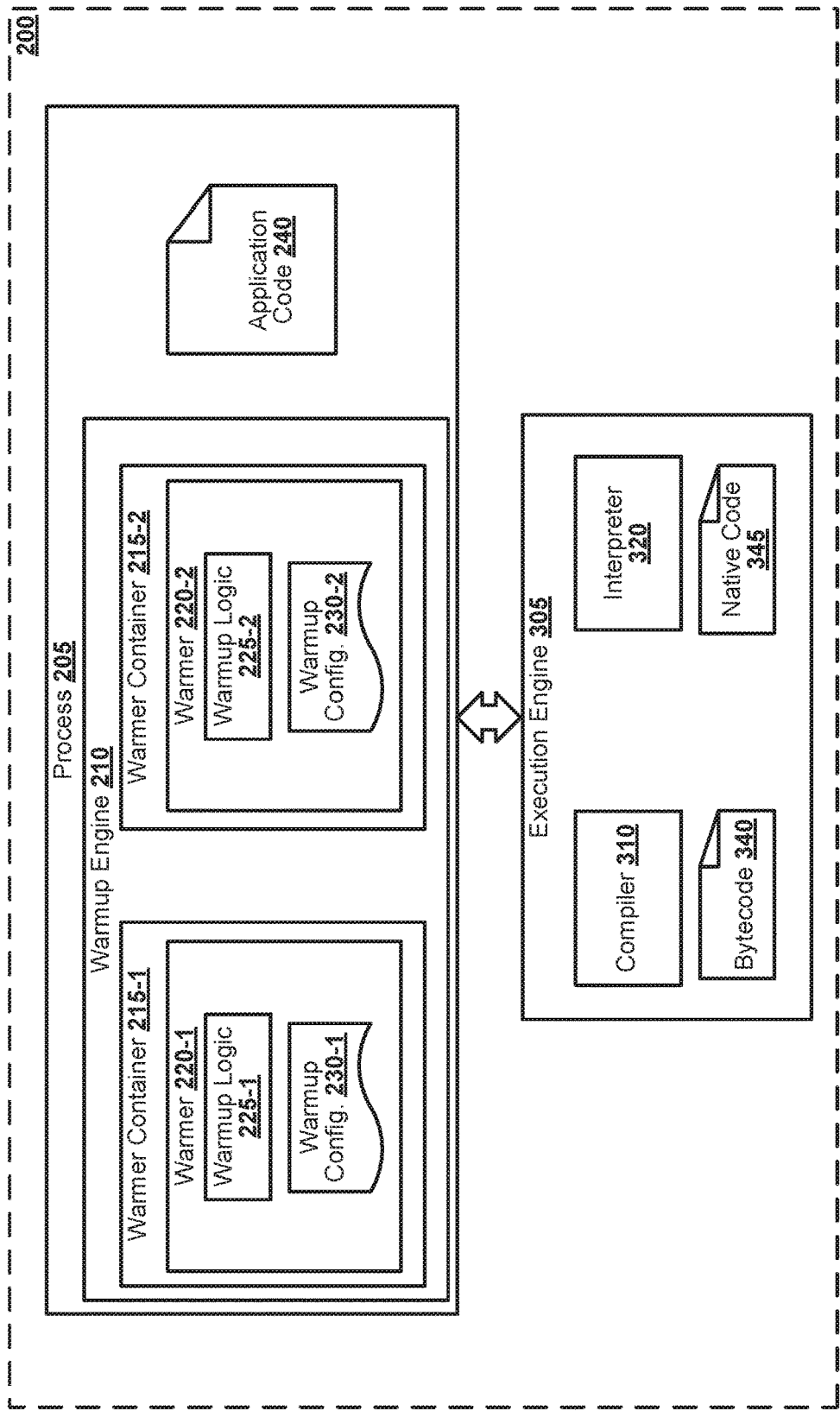
FIG. 2 illustrates an environment in which various example embodiments may be practiced.

FIG. 2 illustrates an environment 200 in which various example embodiments may be practiced. In various examples, the environment 200 may be implemented in or by any computing system described herein, or component thereof, such as the system 16 and/or the application servers 100$_{1-N}$ described with reference to FIGS. 1A-B. The environment 200 may be implemented using circuitry, such as a processor system that is the same or similar to those discussed with regard to FIGS. 1A-1B. In embodiments, the processor system may comprise one or more general purpose processors to be transformed into one or more special purpose processors to perform any of operations described herein responsive to accessing instructions stored in an electronic memory.

As shown, the environment 200 may include process 205. The process 205 may be an instance of an application container (e.g., docker containers, and/or the like), virtual machine (e.g., JVM, etc.), and/or the like that may implement a suitable runtime environment (RTE) for executing program code, such as the application code 240 and warmup engine 210.

The application code 240 (also referred to as "application 240" and/or the like) may be program code, instructions, software module(s), etc. for applications developed by users and/or tenants of a computing system (e.g., system 16). The applications may be configured to interact with user/tenant data stored in the computing system. The application code 240 may be made up of multiple threads that may execute concurrently. The application code 240 may be written in any suitable high-level programming languages, scripting language, and/or schemas, such as Java, C, C#, C++, PHP, Ruby, Python, Perl, Objective-C, Scala, Hypertext Markup Language (HTML) (e.g., extensible HTML (XHTML), HTML5, etc.), Extensible Markup Language (XML), JavaScript, Jscript, Salesforce®, Apex, Salesforce® Visualforce®, Salesforce® Lightning®, and/or other like programming languages. The application code 240 may also be developed using various development tools, such as a software development environment (SDE), an integrated development environment (IDE), a software development kit (SDK), a software development platform (SDP), or other like platform or framework that allows developers to create applications, such as applications for accessing a tenant space. Examples the development tools may include Salesforce® Wave™ Dashboard Designer, Salesforce® Force-.com® IDE, Visualforce®, Android® Studio™ IDE, Apple® iOS® SDK, and/or other like SDEs, IDEs, SDKs, SDPs, etc.

The warmup engine 210 (also referred to as a "centrifuge 210") may be program code, logic, etc. that executes registered warmup logic 225-1 and 225-2 (collectively referred to as "warmup logic 225" and the like) within respective warmer containers 215-1 and 215-2 (collectively referred to as "warmer container 215" and the like). In various embodiments, the warmup engine 210 may comprise one or more warmup libraries that manage and trigger registered warmup tasks, such as warmup tasks defined by warmup logic 225. The warmup engine 210 may be developed using any of the aforementioned programming languages, scripting language, schemas, and/or development tools.

In embodiments, the warmup engine 210 may manage system resources at the time of warm up and may also prioritize warmup tasks as defined by a warmup configuration ("config.") 230-1 and 230-2 (discussed infra). The warmup engine 210 may also be responsible for executing registered warmer 220 implementations (warmers 220-1 and 220-2 may be collectively referred to as "warmer 220" and the like).

In embodiments, the warmup engine 210 may be unaware of the corresponding warmup logic executing within a warmer container 215. In this way, the warmup engine 210 may provide service protection features to ensure application/service warm up runs within a fixed budget (e.g., in terms of processor times, execution time, slowdowns, memory allocation, etc.). In embodiments, the warmup engine 210 may trigger execution of warmup logic 225, for example, by specifically enumerating through all the registered warmers 220. The warmup engine 210 may provide each warmer 220 with a budget of total end-to-end time before a task is interrupted.

Additionally, the warmup engine 210 may monitor and/or detect errors/exceptions, and failures. Upon warmer 220 failure, the error(s) and/or exception(s) causing the failure may be identified and logged, and swallowed (e.g., hidden). By swallowing the errors/exceptions, the warmup engine 210 may prevent the failure from being propagated to the application tier. In embodiments, there may be two types of errors or exceptions, implementation errors and execution errors. Implementation errors may be errors that occur during warmup engine 205, warmer container 215, warmer 220, and/or warmup logic 225 initialization, such as when specified resources are not available, etc. Execution errors may be errors that occur during the execution of the warmup logic 225. Implementation errors may be logged to identify the unavailable resources, and execution errors may be logged to identify where and why the warmer 220 or warmup logic 225 failed. In embodiments, the config 230 may define a number of errors that may be allowed before terminating execution of the warmer.

In some implementations, application warm up may be considered a best effort task, which may be terminated if one or more tasks defined by the warmup logic 225 do not complete so as to not block or prevent application startup. Furthermore, the warmup engine 210 may provide statistics regarding the various warmers 220 that were managed. For example, the warmup engine 210 may indicate a number of registered warmers 220, a total aggregate duration of all warmers 220, individual timings of a warmer 220 execution, and/or other like statistics/data.

The warmup engine 210 may also provide the ability for developers to register their warmup logic with the warmup engine 210, such as by providing various interfaces for registering the warmup logic 225 with the warmup engine 210. In one example, the warmup logic 225 may be added to the configuration 230, which may then be loaded into and read by the warmup engine 205. In another example, warmup logic 225 may be created using any of the programming languages and/or development tools discussed herein, where the warmup logic 225 may include a call to a warmup engine 205 handler and passing parameters required to construct the warmer 220 and/or the warmup logic 225.

The warmer containers 215 may be containers that store separate threads (e.g., a "thread container"). As used herein, the term "thread" may refer to a sequence of instructions that can be allocated to memory and/or scheduled for execution by a processor system. A thread may include one or more instances and/or objects. As used herein, the term "instance" may refer to a concrete occurrence of an object, which may occur, for example, during execution of application code 240. As used herein, the terms "instantiate", "instantiation", etc. may refer to the creation of an instance.

The warmer containers 215 may be responsible for tracking the number of iterations and timeouts to interrupt the warmer 220 process(es). As shown by FIG. 2, the warmup engine 205 includes two warmer containers 215 (e.g., warmer container 215-1 and warmer container 215-2) each of which includes a corresponding warmer 220 with warmup logic 225 and warmup configuration 230. However, in other implementations the warmup engine 205 may include any number of warmer containers 215 each of which may include any number of warmers 220, warmup logic 225 and warmup configuration 230. In some embodiments, there may be a total of N threads in the executor service, where N is two times the number of processor cores. In such embodiments, if the number of warmers 220 is larger than N, then additional warmers 220 (e.g., warmer 220-N+1) may be queued until a warmer container 215 becomes available to implement the next warmer 220. The warmer containers 215 may be developed using any suitable container or virtualization implementations, such as Docker, imctfy, chroot, OpenVZ, and/or the like. In some implementations, the warmer container 215 may be developed using a web container or servlet container, such as Apache® Tomcat, Apache® Geronimo, GlassFish, WildFly, and/or the like.

The warmers 220 may be interfaces (e.g., APIs, language bindings, libraries, etc.) that provide mechanisms for implementers to trigger corresponding warmup logic 215. The warmers 220 may allow corresponding warmup logic 215 to be encapsulated and registered with the warmup engine 210. The warmup logic 225 may be program code that defines various portions of application code 240 (e.g., code snippets), data to fetch and load, etc. to be prioritized over other code snippets and/or data to be loaded. Warmup logic 225 may also ensure a specific component is in an optimal state prior to performing various functions. In one example, when the environment 200 is implemented in or as an app server 100, the warmup logic 225 may be associated with individual components that need to be executed before the app server 100 starts servicing requests.

In the example of FIG. 2, two warmers 220 are shown, each of which includes corresponding warmup logic 225 and a warmup configuration 230. In embodiments, each of warmup logic 225-1 and warmup logic 225-2 may be used to warm up different code snippets of application code 240 or perform different functions. In one example, when application code 240 includes twenty functions labeled one to twenty, warmup logic 225-1 may be used to load and execute a fourth function of the twenty functions, during system startup and warmup logic 225-2 may be used to load a nineteenth function of the twenty functions at a predefined time period after the application startup. In another example, the warmup logic 225-1 may be used to load and execute one or more functions of application code 240 upon application startup and warmup logic 225-2 may be used to request and obtain predetermined data items of one or more database objects from a database system (e.g., system 16 discussed with regard to FIGS. 1A-1B). Although the previous examples discussed the warmup logic 225 performing a single function, in various embodiments, the warmup logic may perform multiple functions, actions, tasks, etc.

The warmup configurations 230 (also referred to as "configurations 230", "configs 230", and/or the like) may be a data structure with an arrangement of functional units that affects behavior and/or performance of the warmup engine 205 and/or a corresponding warmer 220. The configs 230 may be used to define or configure various parameters, attributes, metadata, etc. for warmer 220 implementation and/or execution of corresponding warmup logic 225. In embodiments, the configs 230 may be loaded by the warmer 220 at runtime and injected into the current warmup engine 205 instance. The configurable parameters may include an execution time (e.g., a time (or amount of time) after the initialization process to execute the warmup logic), a timeout period (e.g., an amount of time to run the warmer 220 and/or warmup logic 225 until declaring a timeout), a maximum number of timeouts permitted for a warmer 220 and/or the warmup logic 225; a maximum number of times to run a warmer 220 and/or warmup logic 225 (e.g., a number of iterations); a time delay between each execution of a warmer 220; (e.g., a wait time); environment type in which to execute the warmup logic; and/or other like parameters.

Each of the configs 230 may be a file that is encoded in JavaScript Object Notation (JSON), Human-Optimized Config Object Notation (HOCON), XML, YAML, and/or some other object notation format. An example config 230 is shown by table 1 below.

TABLE 1

```
// configuration for warmup engine
centrifuge {
    env = "dev" // default environment is development ("dev");
    this can be overwritten
            // e.g., Dcentrifuge.env = "blitz"
    // the default configuration, and may be
    overwritten in other sections
    default {
    max_timeout_millis = 30000 // 30 seconds before killing all
    warmup modules
    warmers = [  { // default warmer configuration
    // execute this or not
      enabled false
        // a module's execution is stopped when either
        the max_iteration is reached,
        // or timeout occured
      max_iterations = 100 // max of 100 iterations
      timeout_nulls = 20000 // 20 seconds timeout
      class = "com.salesforce.casp.centrifuge.FooWarmer"
```

TABLE 1-continued

```
      // module class to load
      // configuration to pass to init( ) function of warmer
      config = {  key = "value"  }
      }
    ]
  }
}
dev {
}
// blitz distributed computing environment configuration
blitz {
    warmers =  [  {
      enabled = true
      max_iterations = 100
      timeout_millis = 20000
      class = "common.apex.runtime.impl.ApexPrecompiler"
      config = {  key = "value" }
      }
    ]
}
// production environment configuration
prod {
    max_timeout_millis = 300000 // 5 minute timeout for production
    warmers = [  {
      enabled = true
      max_iterations = 100
      timeout_millis = 20000 // 20 seconds timeout for this warmer
      class = "common.apex.runtime.impl.ApexPrecompile"
      config = {  key = "value" }
      }
    ]
}
```

In the example config 230 of table 1, the "dev" field, the "blitz" field, and the "prod" field may indicate configurations for different environment types in which the corresponding warmup logic 225 is executed; the "max_iterations" may indicate the maximum number of iterations of the warmup logic 225 may be executed, the "timeout_millis" may indicate a timeout period or an amount of time to run the warmer 220 and/or warmup logic 225 until declaring a timeout, the "max_timeout_millis" may indicate a maximum amount of time for running the warmer 220 before declaring a timeout; the "class" may indicate the class name in which the warmer is to be implemented; and the "key" value in the "config" field may indicate a parameter called "key" to be passed to the warmer.

The example config 230 shown by table 1 includes a root level configuration (e.g., the "centrifuge" element), which is a default config that provides initial seeding of the various configuration attributes. Following the default config is a list of environment specific configurations. The particular environment config that is used depends on the runtime environment context of the environment 200. For example, if environment 200 is a production environment (e.g., "prod" in table 1), then the corresponding prod configuration will be loaded. When an application is running in a particular environment, then the values of the environment config may override the parameters defined by the default config. Additionally, parameters defined by the default config may be used if those parameters are not defined by an environment config, or if the environment in which an application is running is not defined by the config 230. However, if a key exists in both the default and a specific environment config, the value from the corresponding environment section overrides the default value. For example, if an application is running in a distributed computing environment (DCE) (e.g., "blitz" in table 1), then the corresponding blitz configuration will be loaded, but the "max_timeout_millis" parameter of the default config may be used since the blitz config does not define that parameter. Although the example shown by table 1 includes configurations for the warmup engine 205 and a warmer 220, in various embodiments, the configs 230 may also include configuration sections for a warmer container 215 that includes the warmer 220.

As shown, the environment 200 may also include execution engine 305, which includes compiler 310 and interpreter 320. Both the compiler 310 may transform the application code 240 into another form, such as bytecode 340 or object code, native code 345 or machine code, etc., which may be executed by the execution engine 305. As used herein, the term "bytecode" may refer to various forms of instruction sets to be executed by an interpreter. The interpreter 320 may parse instructions of the application code 240 and directly execute the instructions one at a time. Some systems, called dynamic translators (e.g., just-in-time (JIT) compilers), may translate bytecode 340 into native code 345 as necessary at runtime. The compiler 310 and interpreter 320 may be any suitable compiler and interpreter depending on the platform/system on which environment 200 runs. Additionally, depending on the specific platform and/or implementation used, compiler 310 and interpreter 320 may be combined or one of compiler 310 of interpreter 320 may be absent.

Although not shown by FIG. 2, the environment 200 and/or the entities therein may include additional or alternative components, regions, areas, etc. For example, in embodiments where the environment 200 includes JVM implementations, the environment 200 may further include a class loader subsystem, runtime data areas, a native method interface and native method libraries, etc. In another example where the environment 200 includes JVM implementations, the execution engine 305 may include a garbage collector, a hotspot profiler, etc. In other implementations, the environment 200 may include a linker to link various object code files into an executable file, and a loader to load the executable file into memory for execution. Other implementations are possible in other embodiments depending on the platform on which the environment 200 runs.

Figure 3:
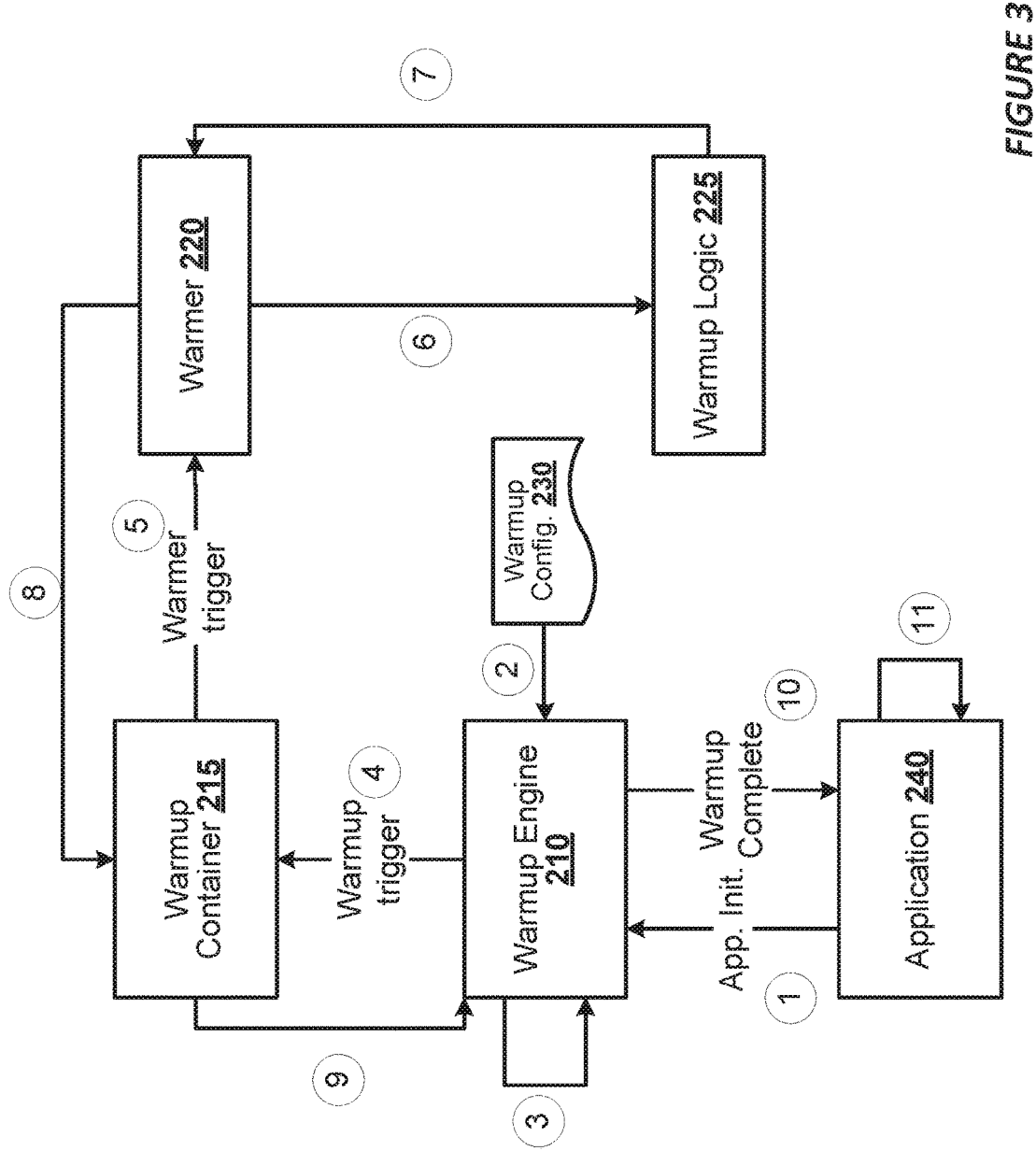
FIG. 3 illustrates logical interaction points between elements of environment of FIG. 2, in accordance with various embodiments.

FIG. 3 illustrates logical interaction points between elements of environment 200, in accordance with various embodiments. In FIG. 3, like numbered items are as described with respect to FIG. 2. The elements of environment 200 may operate as follows.

At operation 1, the warmup engine 210 detects or otherwise identifies application initiation or startup. This may be based on a user input, system startup, a request from another computer system, etc. After an application is started and the corresponding services have been created, the warmup engine 210 may be initialized and started. In embodiments, a suitable application framework may be used to create the warmup engine 210. For example, in implementations where the Spring Framework (provided by Pivotal Software, Inc.) is used, the warmup engine 210 may be created by dependency injection (DI) using Startup Tasks in a Spring Core container. In this example, a BaseAppInitializer.java file may be executed after the StartupTasks have finished. In another example, in implementations where the Scone Framework is used, the warmup engine 210 may be created by dependency injection (DI) into an Inversion of Control (IoC) container. In a Scone container, warmup engine 210 creation may be triggered via ContextRefreshedEvent. In such embodiments, the warmup engine 210 itself may be created by the IoC framework of the application and may be advertised by the corresponding application IoC. Example implementations of scone and core containers are shown by tables 2-1 and 2-2, respectively.

TABLE 2-1 example Core container implementation

```
Centrifuge centrifuge = ProviderFactory.get("Centrifuge);
centrifuge.init ("centrifuge.conf");
centrifuge.start ( );
```

TABLE 2-2 example Scone container implementation

```
@Component
public CentrifugeEventHandler implements
ApplicationListener<ContextRefreshedEvent>
{
    @Autowired
    private final Centrifuge centrifuge;
    @Override
    public void onApplicationEvent(ContextRefreshedEvent event) {
        centrifuge.init( "centrifuge.conf" );
        centrifuge.start( );
    }
}
```

In the examples shown by tables 2-1 and 2-2, the "centrifuge.init( )" function may be used to initialize the warmup engine 205 by the "centrifuge.conf" file, and the "centrifuge.start( )" function may be used to execute the warmup engine 205.

At operation 2, a warmup config 230 may be loaded by the warmup engine 205. During warmup engine initialization, all configurations related to warmup engine 205 may be loaded as well as the metadata about each registered warmer 220. In embodiments, the warmup engine 205 may load the config 230 by determining a corresponding environment context known at runtime, and reading in the configuration 230 into memory. In various embodiments, the default section of the config 230 may be loaded into a configuration instance, and the environment section of the config 230 that is specific to the corresponding environment runtime context may be added if it is new, or it may be replaced if the value for the corresponding property existed previously. In some JVM implementations, a java bean may be used that returns a list of configuration sections based on an identified config 230, and also acquires the environment context in order to determine which ones of the listed configurations are eligible for the current instance of the application 240. In such implementations, the environment type may be injected into the selected configuration section(s) that is/are used to influence which properties are applicable.

When the warmer section of the config 230 is read into memory, a new warmer container 215 instance ("Warmer-Container") may be instantiated containing a corresponding warmer config as well as an instance of a concrete warmer. In embodiments, the warmer config may be a section of the config 230. Additionally, the warmup engine 205 may add the newly created warmer container 215 to a list of warmers 220 (a "warmers list"). At this point, the warmup engine 205 has been initialized, the warmer container 215 has been seeded, and the warmup engine 205 is in a position to start executing the warmer 220.

At operation 3, the warmup engine 205 may be started via a start method (e.g., the "centrifuge.start( )" function shown by tables 2-1 and 2-2), which starts up a thread pool executor service and dispatches all registered warmer containers 220 to the executor service. In embodiments, the thread pool executor service may include twice the number of cores threads. The runtime to complete all registered warmer containers 220 is bounded by the maximum timeout period parameter set in the global/default section of the config 230. In embodiments, the warmup engine 205 may initialize a timer including a value equal to the maximum timeout period, and invoke a timeout of the warmup logic upon expiration of the timer. When timeout is reached, the executor service may be shut down or terminated.

At operation 4, the warmup engine 205 may send a warmup trigger to a next scheduled warmer container 215 to trigger execution of the warmer container 215. In embodiments, the warmup engine 205 may use a call method corresponding to a particular warmer container 215 when it is that instance's turn to run. In some implementations, the warmer container 215 may have a finer grained timeout if that parameter was specified in the warmer container section of the config 230. Also, as discussed previously, the warmer container section of the config 230 may define the number of iterations the contained warmer 220 may be executed, which may be in a range from 1 to M, where M is a number.

At operation 5, the warmer container 215 may send a warmer trigger to the warmer 220 to trigger execution of the warmer 220. At operation 6, the warmer 220 may execute the warmup logic 225. In embodiments, the warmer 220 may execute the warmup logic 225 until the maximum allowable budgeted time specified by the config 230 (e.g., as specified by the "timeout_millis" parameter) is reached. If the warmup logic 225 does not complete within the budgeted time period, then the warmer 220 may invoke a timeout. In embodiments, the warmer 220 may initialize a counter to count a number of invoked timeouts, and may increment the counter for each invoked timeout of the warmup logic 225. The warmer 220 may also terminate execution of the warmup logic 225 when the counter reaches a value equal to the maximum number of timeouts specified by the config 230.

At operation 7, the warmer 220 may obtain an indication that the warmup logic 225 has completed execution when the warmup logic 225 completes execution within the budgeted time period. Upon receipt of this indication, the warmer 220 may declare a successful iteration of the warmup logic 225. In embodiments, the warmer 220 may initialize a counter to count a number of iterations, and may increment the counter for each successful completion of the warmup logic 225. In embodiments, the warmer 220 may execute the warmup logic 225 as many iterations as specified in warmer section of the config 230 (e.g., as specified by a "max_iterations" parameter). The warmer 220 may continue executing the warmup logic 225 until the counter reaches a value equal to the maximum number of warmup logic 225 iterations specified by the warmer section of the config 230.

At operation 8, the warmer 220 may indicate successful execution of the warmup logic 225 to the warmer container 215. In embodiments, the warmer container 215 may call the contained warmer 220 as many iterations as specified in warmer container section of the config 230 (e.g., as specified by a "max_iterations" parameter). In embodiments, the warmer container 215 may initialize a counter to count a number of iterations of the warmer 220, and may increment the counter each time the warmer 220 is successfully executed. The warmer container 215 may continue calling the warmer 220 until the counter reaches a value equal to the maximum number of iterations specified by the warmer container section of the config 230.

Additionally, if the warmer 220 does not complete within a budgeted time period, then the warmer container 215 may invoke a timeout. In embodiments, the warmer container 215 may initialize a counter to count a number of invoked timeouts of the warmer 220, and may increment the counter for each invoked timeout. The warmer 220 may also terminate execution of the warmer 220 when the counter reaches a value equal to the maximum number of warmer 220 timeouts specified by the config 230.

In some embodiments, the warmup engine 210 may call a warmer 220 initialization method only once to initial state and dependencies that a warmer 220 has in order to execute. In such embodiments, the warmup engine 205 may call a corresponding warmer 220 run method one or more times based on how the warmer 220 has been configured or until the maximum warmer 220 run time is reached. An example warmer implementation is shown by table 3 below.

TABLE 3

```
public interface Warmer {
    /** init is called once at the beginning of warmup engine execution
     * config is passed directly from configs
     */
    void init(Map<String, Object>config) throws Exception;
    /** run is called as often as the number of iterations in config
     * or until the timeout for this module is reached
     */ or until the max timeout for engine is reached
    void run( ) throws Exception;
}
```

In the example of table 3, the "init( )" function is the warmer 220 initialization method, and the "run( )" function is the warmer 220 run method.

At operation 9, the warmer container 215 sends an indication of completion of warmer 220 execution after the maximum number of iterations or sends an indication of warmer 220 failure when a maximum number of warmer 220 timeouts is reached. After the scheduling of the warmer container 215 callables is finished or the max allowable time is reached, application 240 warmup may be considered complete.

At operation 10, the warmup engine 205 may send a warmup complete indication to the application 240 to indicate that the desired tasks have been warmed up. In some embodiments, such as those where service availability is gated, a function Centrifuge.isDone( ) may be used to determine if the application 240 is warm and ready to serve client requests or perform other delineated functions.

At operation 11, the application 240 may provide an indication that the application 240 is available. As used herein, "application availability" may refer to the extent that the application 240 is operational, functional, usable, etc. for fulfilling requirements, providing key performance indicators (KPIs), complying with service level agreements (SLAs), and/or the like. In embodiments, the application may indicate availability after the other portions of the application code 240 (i.e., the non-warmed up portions of the application code 240) have been compiled and/or executed. Whether the application 240 is capable of execution, capable of providing KPIs, and/or capable of meeting corresponding SLAs based on full or partial warmup is determined by the application 240 and may be implementation-specific and/or platform-specific.

The warmup engine 205 may be implemented in the following non-limiting use cases to help improve application performance.

HTTP Warmer: The HTTP Warmer may be used in implementations where the environment 200 is used in an app server 100. The HTTP Warmer can be used to trigger the execution of various subsystems of an application, caches.

JIT compilation, classes, servlet, reflection inflation. etc. to be loaded proactively before customer traffic is obtained. This is a warmer for HTTP endpoints. The HTTP Warmer may obtain a list of URLs along with an HTTP method to call, and sends one or more HTTP requests to the given endpoints as many times as indicated by the max_iterations parameter or until the time period indicated by timeout_millis is reached. In an example, the HTTP warmer may be implemented in the "com.salesforce.casp.centrifuge.HttpWarmer" domain. An example implementation of the HTTP warmer is shown by Table 4.

TABLE 4

```
{
    enabled = true
    max_iterations = 100
    timeout_millis = 30000
    class = "com.salesforce.casp.centrifuge.HttpWarmer"
    config = {
        urls = [
            "https://foo.salesforce.com/bar"
            "https://foo.salesforce.com/baz"
        ]
    }
}
```

Distributed Cache Warmer: In embodiments where the environment 200 is a JVM implemented in an app server 100, metadata that client requests depend on may be cached in heap memory in order to reduce response latencies. When the JVM is restarted, the distributed cache (DC) may be flushed. As a result, the cache becomes cold upon restart and will likely require warming. Warming can be expensive from multiple perspectives, specifically the compulsory miss requires fetch from a slower persisted store, increasing request latencies. Another issue is that the first request that misses on a DC entity may trigger the load, while all the other requests that require the same cached DC entity may be blocked to avoid over saturating the resources where the value is being served. This may cause more requests to pile up on the application tier leading to various problems and impacting core service responsiveness. To reduce the likelihood of such issues, a warmer implementation could be utilized by the DC, which may use the hot set of keys when the server shut down to load the cache preemptively, before the service is exposed to customers.

Memcached/Cache as a Service (CaaS) Warmer: Memcached is a distributed memory caching system comprising an in-memory key-value store for small chunks of arbitrary data (e.g., strings, objects) for results of database calls. API calls, page rendering, etc. Memcached/CaaS may be a cloud computing service caching system that allows users to create cache clusters, where each cache cluster comprises one or more cache nodes. Some of these services may use level 1 (L1) cache for memecached/CaaS. In database system implementations, keys may be invalidated when the database system is updated since the newly released version is stored in the key, which may result in hot key/value pair misses after a release. The Memcached/CaaS warmer may be implemented by the database system to enumerate through a list of hot keys that were dumped on a previous shutdown in order to prime the cache.

BerkelyDB Warmer: The BDB warmer may enumerate through a list of hot keys/values that were dumped on a previous shutdown in order to prime the on-heap memory, BerkelyDB (BDB) backend, and/or file system cache.

Apex Precompiler Warmer: In some implementations, an app server 100 may comprise an Apex Precompiler that runs prior to allowing health check systems to advertise themselves as available. Precompiliation may include persisting a list of organizations whose corresponding classes need to be compiled before system or application startup. The system 16 may implement the Apex Precompiler Warmer to avoid lazy compilation being triggered by a customer request. The term "lazy" herein may refer to applications or tasks that do not need warm up and may be initialized according to normal procedures.

Spring Bean Initialization Warmer (SBIW): Java beans with significant startup costs either due to the individual cost of a specific bean, or due to the size of the transitive load of the bean hierarchy, may influence startup time. In app server 100 implementations, beans that are not essential to application startup (e.g., in developer environments) could be marked as lazy in a config 230. In production environments, the SBIW config 230 may trigger warmup after application startup and before the web container starts handling traffic.

Figure 4:
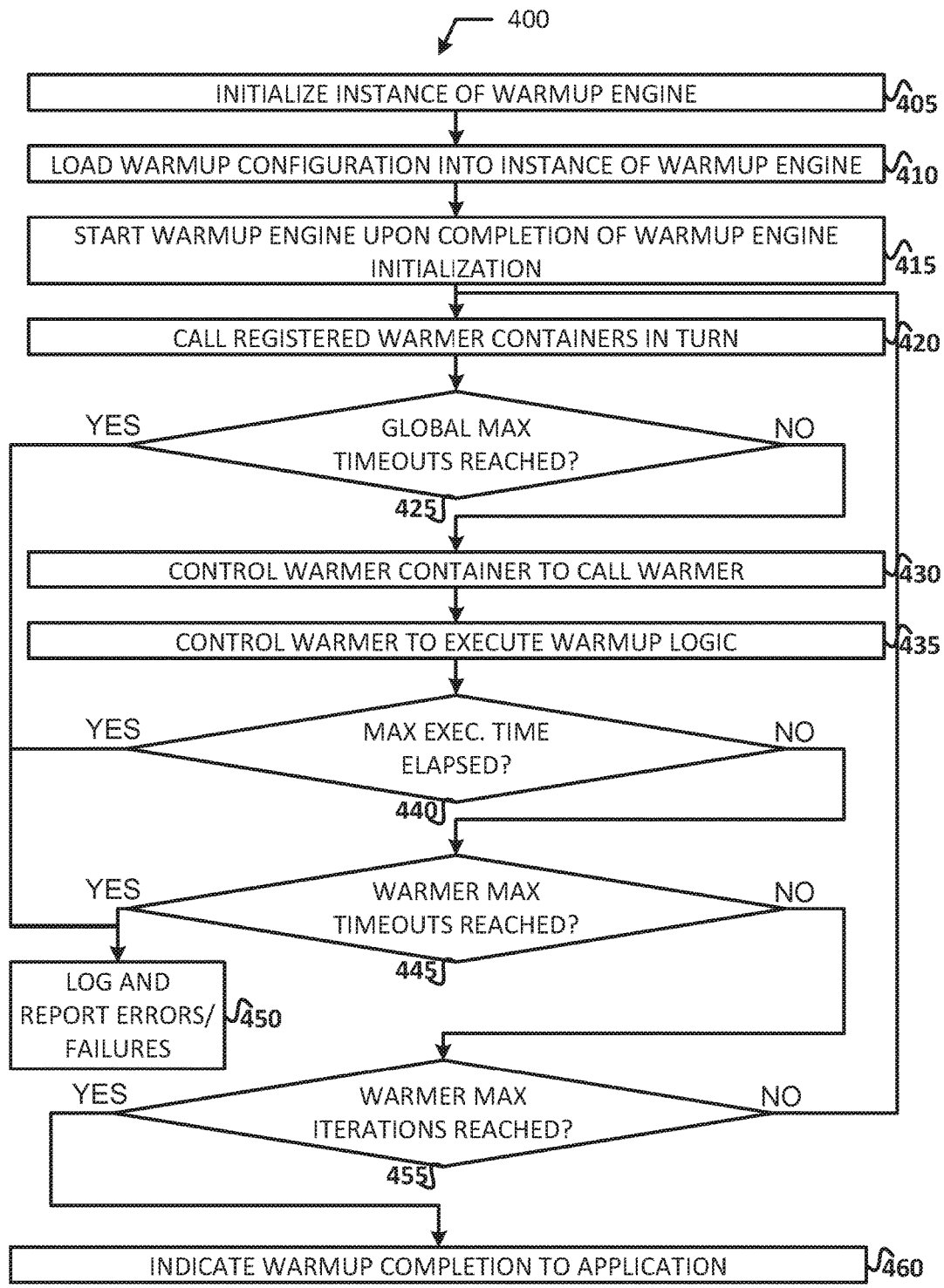
FIG. 4 illustrates a process for operating a warmup engine, in accordance with various embodiments.

FIG. 4 illustrates a process 400 for operating warmup engine 205, in accordance with various embodiments. In embodiments, a computer system may include program code, which when executed by one or more processors of the computer system, causes the computer system to perform the various operations of process 400. For illustrative purposes, the operations of process 400 is described as being performed by the elements discussed with regard to FIGS. 2-3. However, it should be noted that other computing devices or elements may operate the process 400 in a multitude of implementations, arrangements, and/or environments. While particular examples and orders of operations are illustrated in FIG. 4, in various embodiments, these operations may be re-ordered, separated into additional operations, combined, or omitted altogether.

Process 400 may begin at operation 405 where a processor system of a computer system (e.g., an app server 100 or database system 16) may initialize an instance of the warmup engine 205. In embodiments, processor system may identify a trigger to initialize the warmup engine 205 based on a command, instruction, function/application call, etc., which may be obtained from an application upon initialization, at some predefined time period after application initialization, or during system startup.

At operation 410, the processor system may load a warmup config 230 into the instance of the warmup engine 205. The procedure for loading the config 230 is shown and described with regard to FIG. 5. At operation 415, the processor system may start the warmup engine 205 upon completion of the warmup engine 205 initialization.

At operation 420, the processor system may implement the warmup engine 205 to call registered warmer containers 215 in turn or according to a queue or schedule for calling warmer containers 215. In embodiments, the warmup engine 205 may implement any suitable scheduling algorithm to schedule warmer containers 215, or in some embodiments the config 230 may define an order for calling warmer containers 215.

At operation 425, the processor system may implement the warmup engine 205 to determine whether a global maximum number of timeouts has been reached. The maximum number of timeouts may be defined by the config 230 loaded at operation 410.

If at operation 425 the warmup engine 205 determines that the global maximum number of timeouts has been reached, then the processor system may implement the warmup engine 205 to proceed to operation 450 to log any errors or execution failures, and report the errors failures.

If at operation 425 the warmup engine 205 determines that the global maximum number of timeouts has not been reached, then the processor system may proceed to operation 430 to implement the warmer container 215 to call a corresponding warmer 220. At operation 435, the processor system may implement the warmer 220 to execute the warmup logic 225.

At operation 440, the processor system may implement the warmer 220 to determine whether the maximum period of time for executing the warmup logic 225 has elapsed. This value may be defined in the config 230. If at operation 440 the warmer 220 determines that the maximum period of time for execution has been met, then the processor system may implement the warmer 220 to proceed to operation 450 to log any errors or execution failures, and report the errors failures. If at operation 440 the warmer 220 determines that the maximum period of time for execution has not been met, then the processor system may implement the warmer 220 to proceed to operation 445 to determine if the warmer maximum number of timeouts has been reached.

At operation 445, the processor system may implement the warmer 220 to determine whether the warmer maximum number of timeouts has been reached. This value may be defined in the config 230. If at operation 445 the warmer 220 determines that the warmer maximum number of timeouts has been reached, then the processor system may implement the warmer 220 to proceed to operation 450 to log any errors or execution failures, and report the errors failures. If at operation 445 the warmer 220 determines that the warmer maximum number of timeouts has not been reached, then the warmer 220 may proceed to operation 455 to determine whether the warmer maximum number of iterations has been reached.

At operation 455, the processor system may implement the warmer 220 to determine whether the warmer maximum number of iterations has been reached. This value may be defined in the config 230. If at operation 455 the warmer 220 determines that the warmer maximum number of iterations has not been reached, then the processor system may proceed back to operation 420 to call the next registered warmer container 215.

If at operation 455 the warmer 220 determines that the warmer maximum number of iterations has been reached, then the processor system may proceed to operation 460 to indicate that the warmup procedure has been completed and that the calling application 240 may make itself available. After operation 460, the process 400 may end or repeat as necessary.

Figure 5:
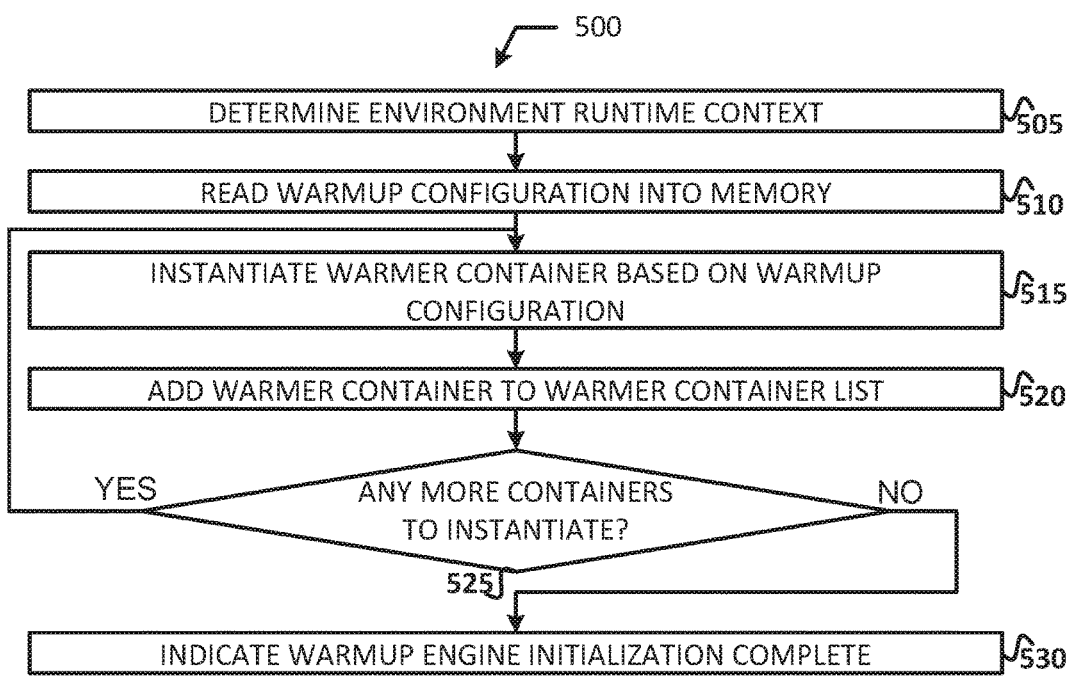
FIG. 5 illustrates a process for loading warmup configuration into a warmup engine instance, in accordance with various embodiments.

FIG. 5 illustrates a process 500 for loading configuration 230 into a warmup engine 205 instance, in accordance with various embodiments. In embodiments, process 500 may correspond to operation 410 of FIG. 4. In embodiments, a computer system may include program code, which when executed by one or more processors of the computer system, causes the computer system to perform the various operations of process 500. For illustrative purposes, the operations of process 500 are described as being performed by the elements discussed with regard to FIGS. 2-3. However, it should be noted that other computing devices or elements may operate the process 500 in a multitude of implementations, arrangements, and/or environments. While particular examples and orders of operations are illustrated in FIG. 5, in various embodiments, these operations may be re-ordered, separated into additional operations, combined, or omitted altogether.

Process 500 may begin at operation 505 where the processor system may determine or identify a runtime context of environment 200. In embodiments where JVM using the Spring framework is used, the environment 200 runtime context may be determined/identified by using the Environment interface and/or class. At operation 510, the processor system may read the warmup config 230 into memory.

At operation 515, the processor system may instantiate a warmer container 215 based on the warmer configuration 230. At operation 520, the processor system may add the warmer container 215 to a warmer container list. At operation 525, the processor system may determine whether there are any other warmer containers 215 to instantiate. If at operation 525 the processor system determines that there are additional warmer containers 215 to instantiate, then the processor system may loop back to operation 515. If at operation 525 the processor system determines that there are no additional warmer containers 215 to instantiate, then the processor system may proceed to operation 530 to indicate that the warmup engine 205 initialization is complete. After operation 530, the process 500 may end.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example. Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. One or more non-transitory computer-readable media (NTCRM) comprising a set of instructions to implement an application warmup engine (AWE), wherein execution of the set of instructions by at least one processing device of a computing system is to cause the computing system to:
   initialize a container during an initialization process of an application;
   execute warmup logic within the container according to a configuration, the warmup logic indicating an action of the application to be performed prior to execution of the application, the configuration indicating parameters for executing the warmup logic; and
   indicate the application as available for execution after the execution of the warmup logic.

2. The one or more NTCRM of claim 1, wherein execution of the set of instructions is to cause the computing system to: load the configuration prior to initialization of the container.

3. The one or more NTCRM of claim 1, wherein the configuration comprises a plurality of parameters, the plurality of parameters include a time after the initialization process to execute the warmup logic, a maximum number of timeouts of the warmup logic, a timeout period, a maximum number of iterations of the warmup logic; and environment type for the warmup logic.

4. The one or more NTCRM of claim 3, wherein, to execute the warmup logic, execution of the set of instructions is to cause the computing system to: execute the warmup logic at the time after the initialization process indicated by the configuration.

5. The one or more NTCRM of claim 3, wherein execution of the set of instructions is to cause the computing system to: initialize a timer including a value equal to the timeout period; and invoke a timeout of the warmup logic upon expiration of the timer.

6. The one or more NTCRM of claim 5, wherein execution of the set of instructions is to cause the computing system to:
   initialize a counter to count a number of the invoked timeouts;
   increment the counter for each invoked timeout; and
   terminate execution of the warmup logic when the counter includes a value equal to the maximum number of timeouts.

7. The one or more NTCRM of claim 1, wherein the action comprises one or more of:
   prefetching or preloading desired program code of the application for execution before loading other program code of the application for execution;
   loading heap memory of the memory system or cache memory of the memory system with data at a predetermined location at a predetermined time;
   sending a request for data items of a database object to a remote database system, and loading the requested data item into a predetermined location of the memory system upon receipt of the requested data item by the network interface;
   transitioning desired bytecode from an interpreted state to a compiled state before transitioning other bytecode from the interpreted state to the compiled state; and
   sending a network request to a remote computing system to access one or more network resources.

8. A computing system, comprising:
   a memory system comprising instructions for operating a warmup engine; and
   a processor system coupled with the memory system, the processor system to execute the instructions to:
      obtain an indication indicating an application initialization process;
      initialize a warmer container during the application initialization process;
      execute warmup logic within the warmer container according to a warmup configuration, the warmup logic indicating an action of the application to be performed prior to making the application available, the warmup configuration indicating parameters for executing the warmup logic; and
      indicate the application as available for execution after the execution of the warmup logic.

9. The computing system of claim 8, wherein the processor system is to execute the instructions to: load the warmup configuration into the memory system prior to initialization of the container.

10. The computing system of claim 8, wherein the warmup configuration comprises a plurality of parameters, the plurality of parameters include a time after the initialization process to execute the warmup logic, a maximum number of timeouts of the warmup logic, a timeout period for completing execution of the warmup logic, a maximum number of iterations of the warmup logic; and environment type in which to execute the warmup logic.

11. The computing system of claim 10, wherein, to execute the warmup logic, the processor system is to execute the instructions to: execute the warmup logic at the time after the initialization process indicated by the warmup configuration.

12. The computing system of claim 10, wherein the processor system is to execute the instructions to: initialize a timer including a value equal to the timeout period; and invoke a timeout of the warmup logic upon expiration of the timer.

13. The computing system of claim 12, wherein the processor system is to execute the instructions to:
   initialize a counter to count a number of the invoked timeouts;
   increment the counter for each invoked timeout; and
   terminate execution of the warmup logic when the counter includes a value equal to the maximum number of timeouts.

14. The computing system of claim 8, wherein the computing system further comprises a network interface, and wherein the action comprises one or more of:
   prefetching or preloading desired program code of the application for execution before loading other program code of the application for execution;
   loading heap memory of the memory system or cache memory of the memory system with data at a predetermined location at a predetermined time;
   controlling the network interface to transmit a request for data items of a database object to a remote database system, and loading the requested data item into a predetermined location of the memory system upon receipt of the requested data item by the network interface;

transitioning desired bytecode from an interpreted state to a compiled state before transitioning other bytecode from the interpreted state to the compiled state; and controlling the network interface to transmit a network request to a remote computing system to access one or more network resources.

15. A method for application warmup, the method comprising:

initializing, by a computer system, a container during an initialization process of an application;

executing, by the computer system, warmup logic within the container according to a configuration, the warmup logic indicating an action of the application to be performed prior to execution of the application, the configuration indicating parameters for executing the warmup logic; and indicating, by the computer system, the application as available for execution after the execution of the warmup logic.

16. The method of claim 15, further comprising:

loading, by the computer system, the configuration prior to initialization of the container, wherein the loading comprises, determining, by the computer system, a current runtime context of the environment in which the application is to execute, reading, by the computer system, the configuration into memory, instantiating, by the computer system, the container based on the configuration, and adding, by the computer system, the container to a list of containers.

17. The method of claim 15, wherein the configuration comprises a plurality of parameters, the plurality of parameters include a time after the initialization process to execute the warmup logic, a maximum number of timeouts of the warmup logic, a timeout period, a maximum number of iterations of the warmup logic; and environment type for the warmup logic.

18. The method of claim 17, wherein executing the warmup logic comprises:

executing, by the computer system, the warmup logic at the time after the initialization process indicated by the configuration.

19. The method of claim 17, further comprising:

initialize a timer including a value equal to the timeout period; and invoke a timeout of the warmup logic upon expiration of the timer.

20. The method of claim 19, further comprising:

initializing, by the computer system, a counter to count a number of the invoked timeouts;

incrementing, by the computer device, the counter for each invoked timeout; and terminating, by the computer device, execution of the warmup logic when the counter includes a value equal to the maximum number of timeouts.

* * * * *